United States Patent [19]
Schroeder

[11] Patent Number: 5,229,198
[45] Date of Patent: Jul. 20, 1993

[54] BEARING MATERIAL HAVING A MATRIX IMPREGNATED WITH POLYMERIC RESIN

[75] Inventor: Robert Schroeder, Rockford, Ill.

[73] Assignee: Pacific Bearing Co., Rockford, Ill.

[21] Appl. No.: 884,934

[22] Filed: May 18, 1992

[51] Int. Cl.$^5$ ............................................. B32B 7/00
[52] U.S. Cl. ................................. 428/256; 384/300; 428/240; 428/242; 428/263; 428/283; 428/402; 428/408; 428/421; 428/422; 428/457
[58] Field of Search ............... 428/240, 241, 242, 244, 428/247, 251, 256, 283, 269, 285, 296, 402, 421, 422, 408, 457, 263; 384/300

[56] References Cited

U.S. PATENT DOCUMENTS

| | | | |
|---|---|---|---|
| 2,863,025 | 12/1958 | Flanagan | 428/269 |
| 3,158,526 | 11/1964 | Farnam et al. | 428/269 |
| 3,652,409 | 3/1972 | Mack et al. | 252/12 |
| 4,116,499 | 9/1978 | Laurizio | 308/3 R |
| 4,632,947 | 12/1986 | Wolki | 523/206 |
| 4,670,089 | 6/1987 | Hanson | 156/629 |
| 4,862,789 | 9/1989 | Burgess et al. | 92/12.2 |

FOREIGN PATENT DOCUMENTS

| | | |
|---|---|---|
| 3304141A1 | 8/1984 | Fed. Rep. of Germany . |
| 3534242A1 | 3/1987 | Fed. Rep. of Germany . |
| 3736292A1 | 5/1989 | Fed. Rep. of Germany . |
| 0131429 | 8/1983 | Japan . |
| 657080 | 9/1951 | United Kingdom . |

Primary Examiner—James J. Bell
Attorney, Agent, or Firm—Leydig, Voit & Mayer

[57] ABSTRACT

A low-friction bearing material includes a matrix formed by a wire mesh screen which is fused to a metal backing sheet. Polytetrafluoroethylene or other polymeric resin fills the interstices within the screen and between the screen and the backing sheet and locks itself rigidly to the screen and the backing sheet in order to impart high strength to the bearing material.

13 Claims, 2 Drawing Sheets

BEARING MATERIAL HAVING A MATRIX IMPREGNATED WITH POLYMERIC RESIN

BACKGROUND OF THE INVENTION

This invention relates to a self-lubricating bearing material and particularly to a bearing material comprising a low friction polymeric resin such as polytetrafluoroethylene (PTFE).

One type of existing bearing material is in the form of a tape. PTFE is mixed with fillers such as bronze powder, moly-disulfide, graphite, carbon, chopped glass fibers or the like to improve the strength and wear rate of the PTFE. The mixture is pressed into a billet which, after being sintered and cured, is skived into a tape. The tape may be etched and then adhesively bonded to a backing to improve the mechanical properties of the bearing material. The load carrying ability of a bearing formed from such material is limited by cold flow or deformation of the skived tape and typically is in the neighborhood of 10,000 psi. at a low velocity of one surface foot per minute.

Another type of bearing material is made by sintering a thin layer of bronze powder to a copper plated steel strip and by coating the strip with a mixture of PTFE and lead. The finished strip is rolled into a journal bearing. Such a bearing (commonly known as a DU bearing) has a high load carrying capacity (e.g., approximately 50,000 psi. to a low surface velocity) but has a very thin wear surface since only a thin overlay of PTFE may be placed on the metal strip. Moreover, a steel strip which is thicker than about 0.120" is difficult and expensive to roll into a bearing and thus the thickness of the bearing is limited. The lead which is mixed with the PTFE presents a health hazard.

In yet another type of bearing material, a wire mesh screen, typically phosphorus bronze, is laminated with a skived PTFE composite tape. The lamination is effected by heat and pressure and sometimes with an adhesive which has an affinity for PTFE. The bearing material is of poor quality since there is only limited attraction between the PTFE tape and the wire mesh. Adhesives are not very effective since they bond only to the etched PTFE surface of the tape, the etched surface being disrupted when the tape is pressed onto the wire mesh.

Wire mesh also is used in another type of bearing material. In this instance, the wire mesh is impregnated with PTFE resin and is covered with a thin overlay of resin which is sintered in place. The resulting bearing has a thin wear surface. To create a high load carrying capacity, it is necessary to adhesively bond the PTFE/-mesh layer to a metal or fiberglass backing. The integrity of the bearing material is limited to the strength of the adhesive bond and, since PTFE is difficult to bond to metal or fiberglass, the bearing material is relatively low in strength. Moreover, it is not feasible to use a continuous process to press resin with a high concentration of fillers or with fillers of large particle size into an unsupported wire screen.

SUMMARY OF THE INVENTION

The general aim of the present invention is to provide a new and improved high strength bearing material which lends itself to a variety of forms of finished bearings, to various load carrying applications, to either thick or thin wear surfaces and to a variety of manufacturing processes.

A more detailed object of the invention is to achieve the foregoing by providing a bearing material in which a gridwork of metallic wire mesh is rigidly fused by heat to a metallic backing to form a matrix which then is filled and overlaid with either filled or unfilled polymeric resin such as PTFE. By fusing the wire mesh to the metallic backing, the need and drawbacks of adhesively bonding resin to a backing material are eliminated and yet, at the same time, the interstices in the wire mesh and between the wire mesh and the backing cause the plastic to be locked mechanically and securely within the matrix to impart high strength to the bearing material.

These and other objects and advantages of the invention will become more apparent from the following detailed description when taken in conjunction with the accompanying drawings.

DETAILED DESCRIPTION OF THE PREFERRED EMBODIMENT

Figure 1:
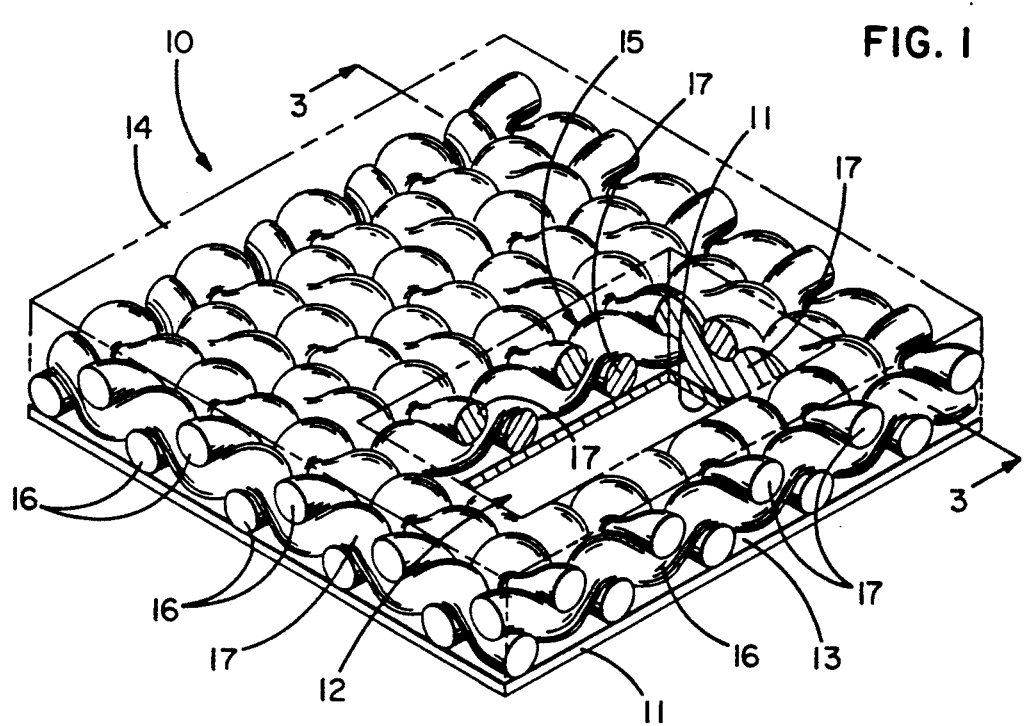
FIG. 1 is a perspective view showing a new and improved bearing material incorporating the unique features of the present invention on a greatly enlarged scale, portions of the resin and the wire mesh being broken away.
Figure 2:
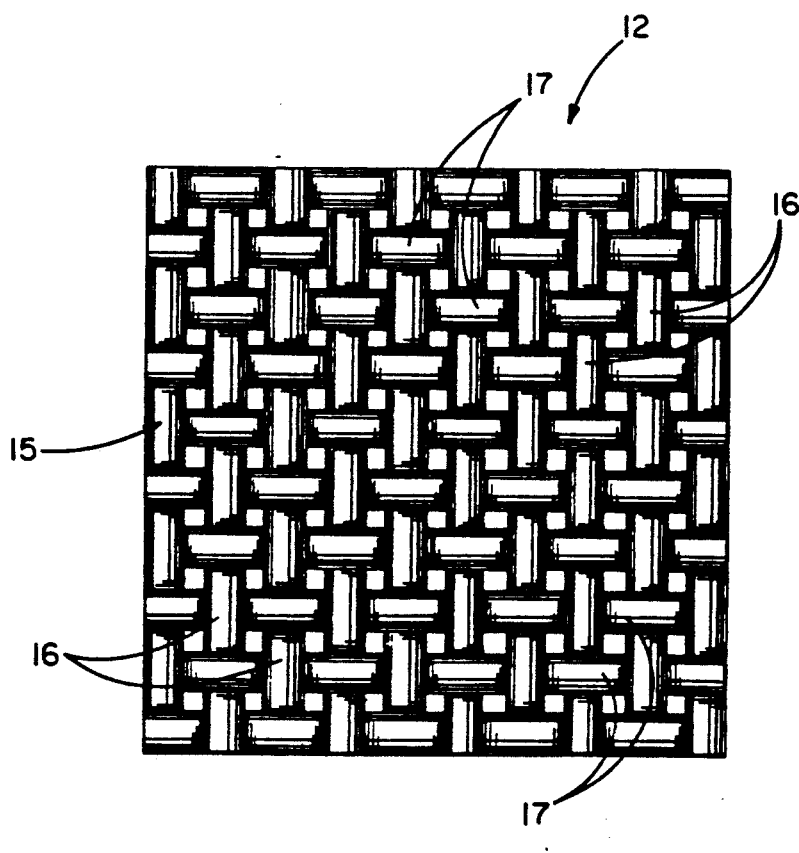
FIG. 2 is top plan view schematically showing the matrix.

In the bearing material 10 of the present invention, a metallic backing 11 is used to form part of a matrix 12 for holding a polymeric resin 13 that creates a low-friction bearing surface 14. In the embodiment shown in FIGS. 1-3, the backing 11 is in the form of a flat metal sheet such as shim stock which, depending upon the particular application of the bearing material, may be either thick or thin. The thickness of the backing sheet 11 may, for example range between 0.005" and 0.090" and typically will be between 0.015" and 0.030". Various metallic materials may be used as the backing sheet. Typical materials include steel, stainless steel, copper, brass, aluminum or other ferrous or non-ferrous metals. Depending upon the application, the backing sheet may be plated, may be made of high temperature alloys, or may be a bimetallic material. A preferred backing sheet is steel shim stock having a thickness of 0.020" and plated with copper having a thickness ranging from 0.0005" to 0.001".

The second component of the matrix 12 is defined by a gridwork 15 of metallic wires and, in carrying out the invention, the gridwork is fused to one side of the backing sheet 11. Herein, the gridwork is formed by a welded wire mesh screen preferably having a first series of wires 16 extending in one direction and a second series of wires 17 extending in a perpendicular direction. The wires 16 are interwoven with and are fused by heat to the wires 17 to create a gridwork or wire mesh screen. The wires 16, 17 may be of small diameter and closely woven or may be of a larger diameter with a coarse weave. Alternatively, fine wire may be closely woven to thicker wire having an open weave. Wire materials which are suitable for use in the matrix 12 include bronze, phosphorous bronze, aluminum or other ferrous or non-ferrous materials and, in some cases, high temperature alloys. The wire mesh screen 5 may range in thickness from 0.015" to 0.125" or thicker, this being in comparison to prior technology where the maximum screen thickness is limited to approximately 0.040". Various methods may be used to fuse the wire mesh to the metal backing sheet 11, including welding, ultrasonic welding, sintering or pressure fusing. Such fusing causes portions of both series of wires 16 and 17 to become securely connected to the backing sheet 11.

Interstices exist, of course, between the wires 16 and the wires 17. Interstices also exist between the wires 16, 17 and the backing sheet 11. In keeping with the invention, such interstices are filled with polymeric resin 13 after the wire mesh screen has been fused to the backing sheet. In the preferred embodiment, the resin is compaction processable polytetrafluoroethylene (PTFE) or compounds thereof, either with no mechanical filler or with high or low concentrations of mechanical fillers (typically 5 percent to 50 percent by weight) such as bronze powder, moly-disulfide, graphite, carbon and/or chopped glass fibers. Melt processable PTFE and FEP (tetrafluoroethylene-perfluoropropylene copolymer) compounds, however, also may be used as well as acetels which encapsulate silicon oil or the like. High performance melt processable plastics such as polyetherketon (PEEK) also may be employed.

The resin 13 fills the interstices or voids between the wires 16 and 17 and between those wires and the backing sheet 11. The resin creates a mechanical locking action by flowing around and under the several strands of wire and above the backing sheet. The resin in the interstices between the wires causes the resin to lock itself in place, much like a rivet shank expanding in a hole. The increased surface area provided by the wires and by the backing sheet improves the ability of the resin to mechanically lock to those components. Since PTFE has a low bonding attraction to other materials, the increased surface area provided by the wire mesh screen and the fused backing sheet significantly improves the strength and integrity of the bearing material 11. Before the interstices are filled with resin, a thin layer of bronze powder may be sintered to the wire mesh screen and/or to the backing sheet. The increased surface area and the microscopic voids or pockets provided by the sintered powder increase the locking action of the resin.

Figure 3:
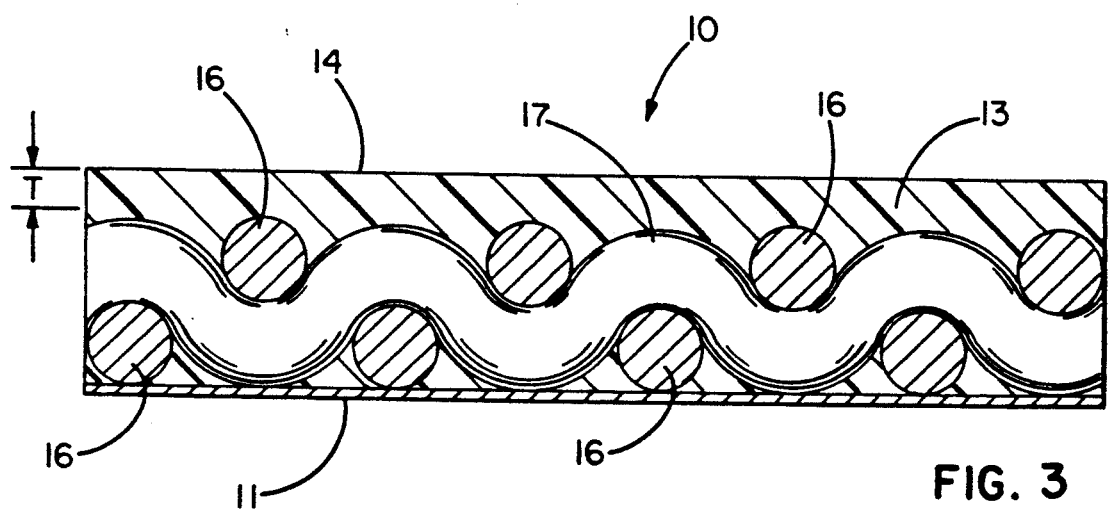
FIG. 3 is an enlarged cross-section taken along the line 3—3 of FIG. 1.
Figure 4:
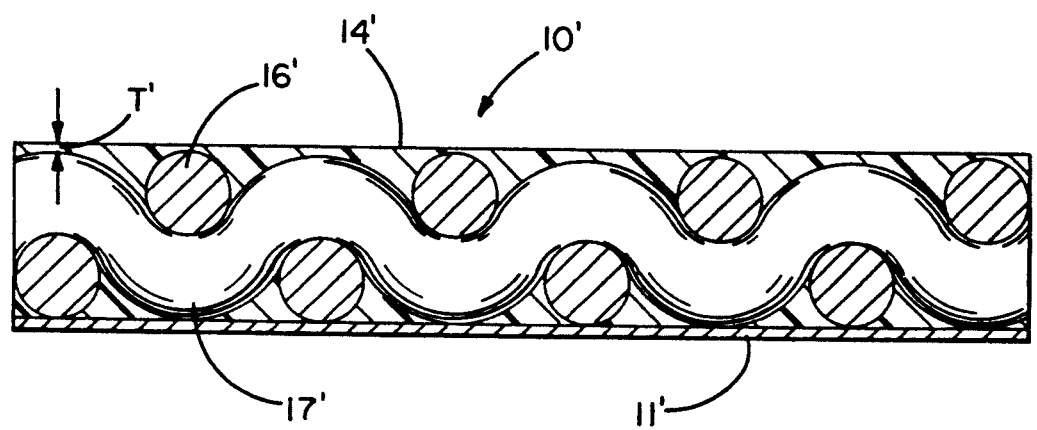
FIG. 4 is a view similar to FIG. 3 but shows a modified version of the bearing material.
Figure 5:
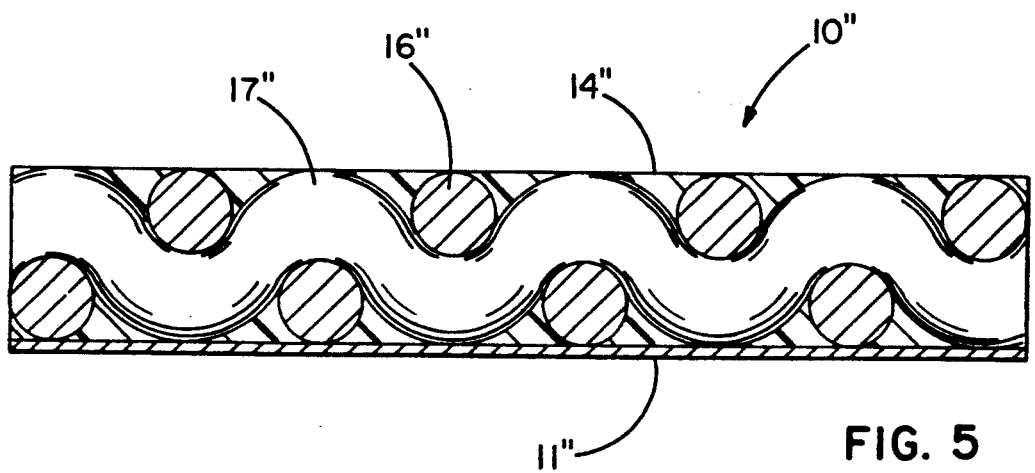
FIG. 5 also is a view similar to FIG. 3 but shows yet another modified versions of the bearing material.

In the bearing material 10 shown in FIG. 3, the upper portions of the wires 16, 17 are covered with a relatively thick (e.g., 0.060") overlay of resin defining a thick wear surface T whereas, in the bearing material 10' shown in FIG. 4, the overlay is significantly thinner (e.g., 0.005") and forms a thin wear surface T'. In some instances, the extreme upper portions of the wire mesh may be left exposed as in the case of the bearing material 10" shown in FIG. 5, the top of the resin being substantially flush with the tops of the wires 16" and 17".

A bearing with very high load carrying capacity may be created by fusing a thin and tightly woven wire mesh to a thin backing strip 11. The plastic overlay of such a bearing should be thin. A medium load capacity bearing with a thick wear surface may be produced by fusing coarse woven thick wire to a thin backing strip and by covering the mesh with a relatively thick plastic overlay. Bearings of this type with a thick consumable wear surface are used in applications where the primary need is for a long and trouble-free service life with load carrying capability above 5,000 psi. Examples of such applications are bearings for machine tool slideways, saddle bearings for axial piston hydraulic pumps, and bearings for railroad, mining and construction equipment. With the present bearing material, the overlay may be 0.125" or thicker, this being in comparison to prior technology which generally is limited to a thin (e.g., 0.003"-0.006") plastic overlay on the backing material.

A thin backing strip 11 enables the plastic to be compressed into the wire mesh screen and then cured by sintering or the like in a high speed and comparatively economical continuous process. The backing sheet eliminates the need for special handling equipment for performing the process. If the backing sheet 11 is thicker, the bearing material may be formed by a batch process. A batch process also may be used when the backing sheet, rather than being originally in the form of a flat strip, is initially in the shape of a ring whose inner diameter, outer diameter or face is fused to a wire mesh screen.

Other advantages of the present bearing material include the ability to use a relatively thick backing sheet 11. By using a thick backing sheet with a thick wire mesh screen, the thickness of the bearing material may exceed 0.120" and, because of the formability of the matrix, bearings with thicker walls may be rolled into tighter radiuses. The metal matrix carries friction-generated heat away from the plastic material to the surrounding bearing housing so as to improve the service life of the bearing. Indentations or pockets may be pressed into the exposed surface of the plastic material to capture lubricants and allow continuous lubrication of the bearing. In addition, the reverse side of the metal backing sheet may be adhesively bonded or soldered to another surface with comparative ease in order to increase the mechanical properties of the bearing material. This is in contrast to prior wire mesh bearing materials having exposed PTFE surfaces which have low adhesion properties and are difficult to bond.

I claim:

1. A bearing material comprising a backing made of metal, a gridwork of metal wire, said gridwork comprising first and second series of wires with the wires of said first series being interwoven with an extending crosswise of the wires of said second series and being fused thereto, portions of the wires of each series being fused to said backing, said wires and said backing defining a matrix having interstices located between said wires and located between said wires and said backing, and a polymeric resin filling said interstices and held in place by said wires and said backing.

2. A bearing material as defined in claim 1 in which said resin is polytetrafluoroethylene.

3. A bearing material as defined in claim 1 in which said resin is selected from the group consisting essentially of polytetrafluoroethylene (PTFE), tetrafluoroethylene-perfluoropropylene copolymer (FEP), polyetherketon (PEEK) and mixtures of PTFE and FEP.

4. A bearing material as defined in claim 3 in which said resin is impregnated with a mechanical filler selected from the group consisting essentially of bronze powder, moly-disulfide, graphite, carbon and chopped glass fibers.

5. A bearing material as defined in claim 1 in which said backing is made from a metal selected from the group consisting essentially of steel, stainless steel, copper, brass and aluminum.

6. A bearing material as defined in claim 1 in which said backing is made from steel plated with copper.

7. A bearing material as defined in claim 5 in which said wires are made of a metal selected from the group consisting essentially of bronze, phosphorous bronze, aluminum and stainless steel.

8. A bearing material as defined in claim 1 in which portions of said wires are at least partially exposed and left uncovered by said resin.

9. A bearing material as defined in claim 1 in which a layer of said resin totally covers said wires.

10. A bearing material as defined in claim 9 in which said layer of resin is substantially thicker than said backing.

11. A bearing material as defined in claim 9 in which said layer of resin is thinner than said backing.

12. A bearing material comprising a backing made of metal, a woven metallic screen fused to said backing, said screen and said backing defining a matrix having interstices located within said screen and between said screen and said backing, and a polymeric resin filling said interstices and locked in place by said screen and said backing.

13. A bearing material as defined in claim 12 in which a layer of bronze powder is sintered to said backing and said screen.

* * * * *